(12) United States Patent
Miyawaki et al.

(10) Patent No.: US 12,138,603 B2
(45) Date of Patent: Nov. 12, 2024

(54) MIXING MEMBER, EXHAUST PURIFYING DEVICE, AND VEHICLE

(71) Applicant: ISUZU MOTORS LIMITED, Tokyo (JP)

(72) Inventors: Ken Miyawaki, Fujisawa (JP); Nobutaka Ayabe, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 705 days.

(21) Appl. No.: 17/421,559

(22) PCT Filed: Dec. 23, 2019

(86) PCT No.: PCT/JP2019/050235
§ 371 (c)(1),
(2) Date: Jul. 8, 2021

(87) PCT Pub. No.: WO2020/145101
PCT Pub. Date: Jul. 16, 2020

(65) Prior Publication Data
US 2022/0097012 A1 Mar. 31, 2022

(30) Foreign Application Priority Data
Jan. 10, 2019 (JP) .................................. 2019-002519

(51) Int. Cl.
*B01F 25/43* (2022.01)
*B01D 53/94* (2006.01)
(Continued)

(52) U.S. Cl.
CPC .... *B01F 25/43171* (2022.01); *B01D 53/9418* (2013.01); *B01F 23/21* (2022.01);
(Continued)

(58) Field of Classification Search
None
See application file for complete search history.

(56) References Cited

U.S. PATENT DOCUMENTS 10,138,789 B1 11/2018 Mishra et al.
2006/0191254 A1 8/2006 Bui et al.
(Continued)

FOREIGN PATENT DOCUMENTS

CN 101128653 2/2008
CN 103748330 4/2014
(Continued)

OTHER PUBLICATIONS

Rolf, K. DE102008029809A1—translated document (Year: 2009).*
International Search Report for International Application No. PCT/JP2019/050235; Date of Mailing, Mar. 10, 2020.

*Primary Examiner* — Jelitza M Perez (57) ABSTRACT

This mixing member is provided with a base portion disposed in the exhaust pipe, separated from an inner wall thereof, and a plurality of blade portions which extend from the base portion toward the inner wall, and which generate a swirling flow of the exhaust gas on a downstream side, in the exhaust direction, of the mixing member, wherein: the blade portions are disposed inclined with respect to the exhaust direction such that the position of a connecting portion with the base portion is at a most downstream position thereof, in the exhaust direction; and the base portion includes a reducing agent passage which penetrates through both end surfaces thereof in the exhaust direction, and which allows the reducing agent to pass through from an upstream side to a downstream side of the mixing member in the exhaust direction.

6 Claims, 5 Drawing Sheets

(51) Int. Cl.
  *B01F 23/21* (2022.01)
  *B01F 25/431* (2022.01)
  *F01N 3/08* (2006.01)
  *F01N 3/20* (2006.01)
  *F01N 3/28* (2006.01)

(52) U.S. Cl.
  CPC ......... *F01N 3/0842* (2013.01); *F01N 3/2066* (2013.01); *F01N 3/2892* (2013.01)

(56) References Cited

U.S. PATENT DOCUMENTS

| | | |
|---|---|---|
| 2012/0151902 A1 | 6/2012 | Yi et al. |
| 2014/0216015 A1 | 8/2014 | Itoh et al. |

FOREIGN PATENT DOCUMENTS

| | | | |
|---|---|---|---|
| DE | 102008029809 A1 * | 12/2009 | .......... B01F 3/04049 |
| EP | 2609996 A | 7/2013 | |
| JP | 2011111927 A | 6/2011 | |
| JP | 2013133805 A | 7/2013 | |
| JP | 2013136975 A | 7/2013 | |
| JP | 2014015848 A | 1/2014 | |
| KR | 10-2017-0027525 | 3/2017 | |
| WO | 2017126120 A1 | 7/2017 | |

* cited by examiner

MIXING MEMBER, EXHAUST PURIFYING DEVICE, AND VEHICLE

CROSS REFERENCE TO RELATED APPLICATIONS

This is the U.S. national stage of application No. PCT/JP2019/050235, filed on Dec. 23, 2019. Priority under 35 U.S.C. § 119(a) and 35 U.S.C. § 365(b) is claimed from Japanese Application No. 2019-002519, filed Jan. 10, 2019, the disclosure of which is also incorporated herein by reference.

TECHNICAL FIELD

The present disclosure relates to a mixing member, an exhaust purifying apparatus, and a vehicle.

BACKGROUND ART

In the related art, for an exhaust purifying apparatus for an internal combustion engine, a configuration is known in which ammonia is generated by a reducing agent such as urea water and reduction action of the ammonia and nitrogen oxide in an exhaust gas is promoted using a selective reduction catalyst. For such a configuration, a configuration including a mixing member for mixing a reducing agent and an exhaust gas is known.

For example, Patent Literature (hereinafter, referred to as "PTL") 1 discloses a configuration including: a plurality of blade portions that generates a swirling flow for mixing a reducing agent with an exhaust gas; and a support portion that supports the plurality of blade portions.

CITATION LIST

Patent Literature

PTL 1
  WO 2017/126120

SUMMARY OF INVENTION

Technical Problem

In the configuration described in PTL 1, however, the reducing agent adhering to the blade portions may drop on an upstream side of a mixing member to become a white deposit in an exhaust pipe. This white deposit may block inside of the exhaust pipe to make it impossible to perform a predetermined exhaust gas treatment.

An object of the present disclosure is to provide a mixing member, an exhaust purifying apparatus, and a vehicle that are capable of restraining a reducing agent adhering to a blade portion from dropping on a upstream side of a mixing member.

Solution to Problem

A mixing member according to the present disclosure mixes an exhaust gas with a reducing agent. The exhaust gas flows through an exhaust pipe in an exhaust direction. The reducing agent is supplied into the exhaust pipe. The mixing member includes: a base portion disposed in the exhaust pipe and separated from an inner wall of the exhaust pipe; and a plurality of blade portions which extends from the base portion toward the inner wall, and which generates a swirling flow of the exhaust gas on a downstream side of the mixing member in the exhaust direction. The plurality of blade portions is disposed inclined with respect to the exhaust direction such that a connection portion of the plurality of blade portions with the base portion is located at a most downstream position of the plurality of blade portions in the exhaust direction. The base portion includes a reducing agent passage which penetrates both end surfaces of the base portion in the exhaust direction, and which allows the reducing agent to pass through from an upstream side of the mixing member to the downstream side thereof in the exhaust direction.

An exhaust purifying apparatus according to the present disclosure includes: the exhaust pipe; a selective reduction catalyst provided in the exhaust pipe and promoting reduction of nitrogen oxide in the exhaust gas; a reducing agent supply portion provided in a stage before the selective reduction catalyst in the exhaust pipe and supplying the reducing agent into the exhaust pipe; and the mixing member disposed to face a supply port of the reducing agent supply portion in the exhaust pipe.

A vehicle according to the present disclosure includes the exhaust purifying apparatus described above.

Advantageous Effects of Invention

According to the present disclosure, it is possible to restrain a reducing agent adhering to a blade portion from dropping on a upstream side of a mixing member.

DESCRIPTION OF EMBODIMENTS

Figure 1:
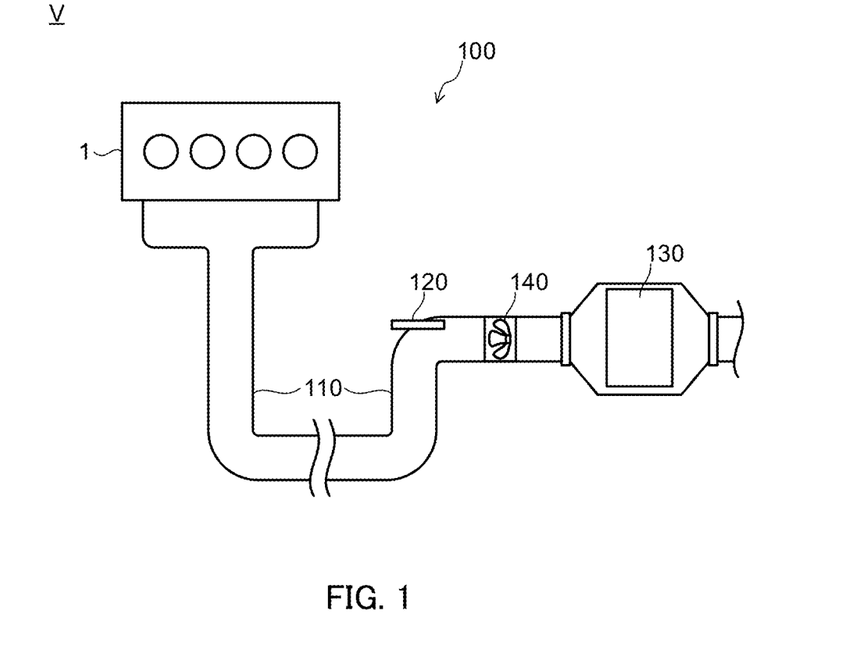
FIG. 1 is a schematic configuration diagram illustrating an exhaust system of an internal combustion engine to which an exhaust purifying apparatus according to an embodiment of the present disclosure is applied.

Hereinafter, an embodiment of the present disclosure will be described in detail with reference to the accompanying drawings. FIG. 1 is a schematic configuration diagram illustrating an exhaust system of internal combustion engine 1 to which exhaust purifying apparatus 100 according to the embodiment of the present disclosure is applied.

As illustrated in FIG. 1, internal combustion engine 1 is, for example, a diesel engine mounted on vehicle V. Internal combustion engine 1 is provided with exhaust purifying apparatus 100 for guiding an exhaust gas generated in internal combustion engine 1 into the atmosphere. Exhaust purifying apparatus 100 includes exhaust pipe 110, reducing agent supply portion 120, selective reduction catalyst 130, and mixing member 140.

An exhaust gas generated from internal combustion engine 1 flows through exhaust pipe 110. Exhaust pipe 110 is provided with reducing agent supply portion 120, mixing member 140, selective reduction catalyst 130, and the like in this order from an upstream side of a direction in which an exhaust gas flows (hereinafter, referred to as "exhaust direction").

Reducing agent supply portion 120 supplies a reducing agent (urea water) for generating ammonia into exhaust pipe 110. Further, reducing agent supply portion 120 is provided in a stage before selective reduction catalyst 130, and supplies the reducing agent toward mixing member 140. When the reducing agent is supplied into exhaust pipe 110 by reducing agent supply portion 120, the reducing agent is hydrolyzed due to the temperature in exhaust pipe 110 to generate ammonia.

Selective reduction catalyst 130 is provided in a stage after reducing agent supply portion 120 in exhaust pipe 110, and adsorbs ammonia generated based on the reducing agent supplied by reducing agent supply portion 120. Selective reduction catalyst 130 reacts the adsorbed ammonia with nitrogen oxide contained in an exhaust gas passing through selective reduction catalyst 130 to reduce the nitrogen oxide.

Figure 2:
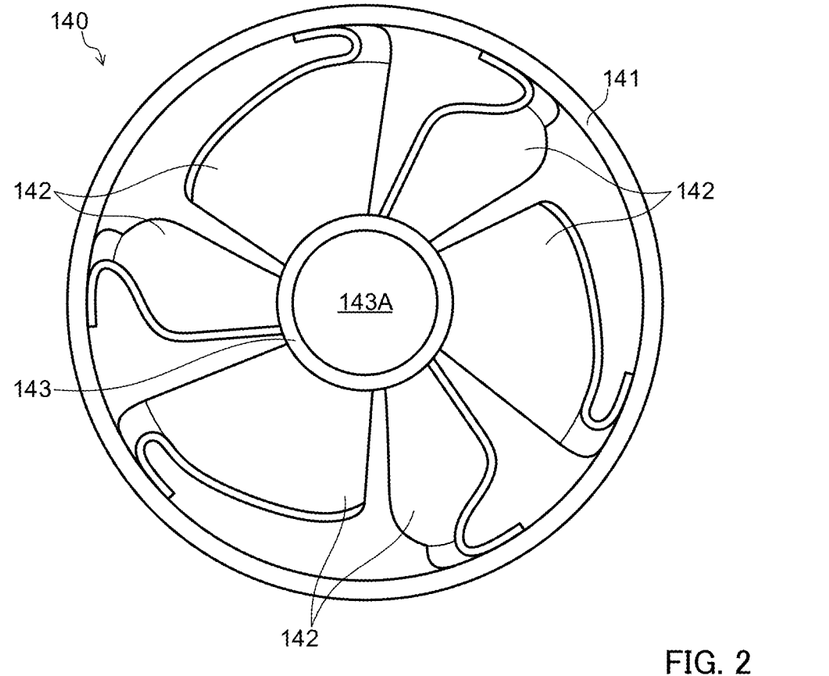
FIG. 2 illustrates a mixing member viewed from an exhaust direction.

As illustrated in FIG. 2, mixing member 140 is a member that mixes an exhaust gas with the reducing agent supplied by reducing agent supply portion 120. Mixing member 140 is disposed to face reducing agent supply portion 120 in exhaust pipe 110, and includes main body portion 141, a plurality of blade portions 142, and base portion 143.

Main body portion 141 is configured to have, for example, a shape with a circular outer peripheral surface so as to be insertable into exhaust pipe 110. Note that, the shape of main body portion 141 is not limited thereto, and can be appropriately changed in accordance with the shape of exhaust pipe 110.

Main body portion 141 is configured to have a cylindrical shape, and is provided in a gas flow path in exhaust pipe 110. Thus, an exhaust gas, and the reducing agent supplied from reducing agent supply portion 120 flow into inside of main body portion 141. The plurality of blade portions 142 and base portion 143 are provided inside main body portion 141.

An exhaust gas or the like passes through main body portion 141 so that the plurality of blade portions 142 generates a swirling flow of the exhaust gas on a downstream side of exhaust pipe 110 in the exhaust direction. Thus, the reducing agent supplied into exhaust pipe 110 and the exhaust gas are mixed. Base portion 143 is configured to have a columnar shape, and is formed integrally with the plurality of blade portions 142 by welding or the like, for example.

Each blade portion 142 is provided so as to surround the periphery of base portion 143. Each blade portion 142 is provided in base portion 143 so as to face blade portion 142 adjacent thereto on a downstream side in the clockwise direction of FIG. 2. Note that, although six blade portions 142 are provided in the present embodiment, the number thereof can be appropriately set as long as the number allows the swirling flow described above to be generated.

Figure 3:
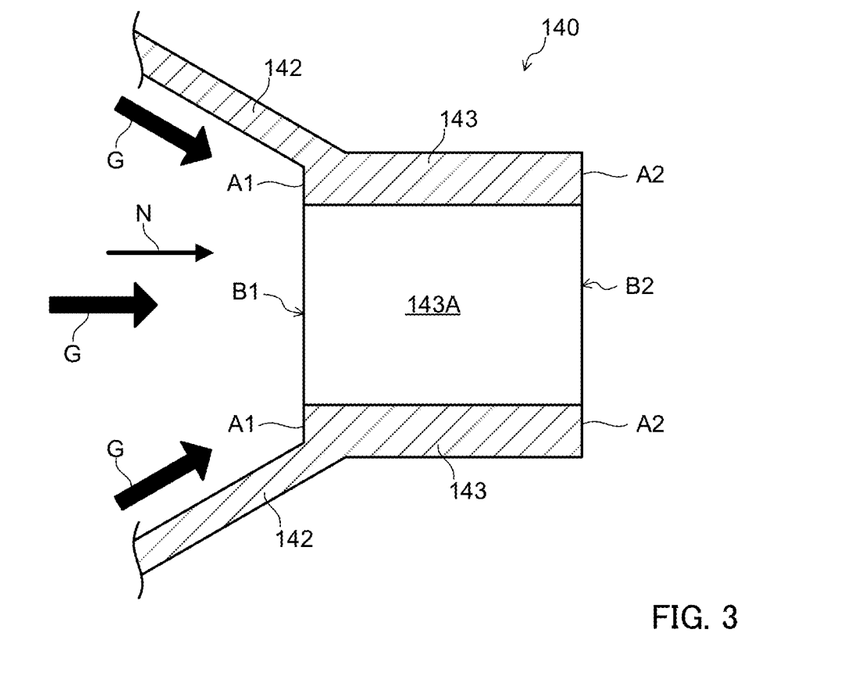
FIG. 3 is a cross-sectional view of the mixing member.

The plurality of blade portions 142 extends from upstream end surface A1 of base portion 143 on an upstream side in the exhaust direction toward an inner wall of exhaust pipe 110, that is, an inner wall of main body portion 141. As illustrated in FIG. 3, blade portions 142 are disposed inclined with respect to the exhaust direction such that a connection portion of blade portions 142 with base portion 143 is located at a most downstream position of blade portions 142 in the exhaust direction. Note that, the exhaust direction in FIG. 3 is a direction from the left toward the right.

Specifically, blade portions 142 are disposed inclined so as to guide exhaust gas G to reducing agent inlet B1 to be described later. The inclination angle of blade portions 142 with respect to the exhaust direction is an angle such that exhaust gas G smoothly flows into reducing agent inlet B1 along surfaces of blade portions 142 when exhaust gas G collides with blade portions 142. The inclination angle can be appropriately set by an experiment or the like.

Base portion 143 includes reducing agent passage 143A which penetrates both end surfaces of base portion 143 in the exhaust direction. Specifically, base portion 143 includes reducing agent inlet B1, reducing agent outlet B2, and reducing agent passage 143A communicating reducing agent inlet B1 with reducing agent outlet B2. Reducing agent inlet B1 is formed inside a connection part of base portion 143 with blade portions 142 at upstream end surface A1. Reducing agent outlet B2 is formed at downstream end surface A2 on a downstream side in the exhaust direction.

Reducing agent passage 143A is configured such that exhaust gas G and reducing agent N contained in exhaust gas G enter reducing agent passage 143A through reducing agent inlet B1 and flow out to a downstream side of mixing member 140 through reducing agent outlet B2.

Figure 4A:
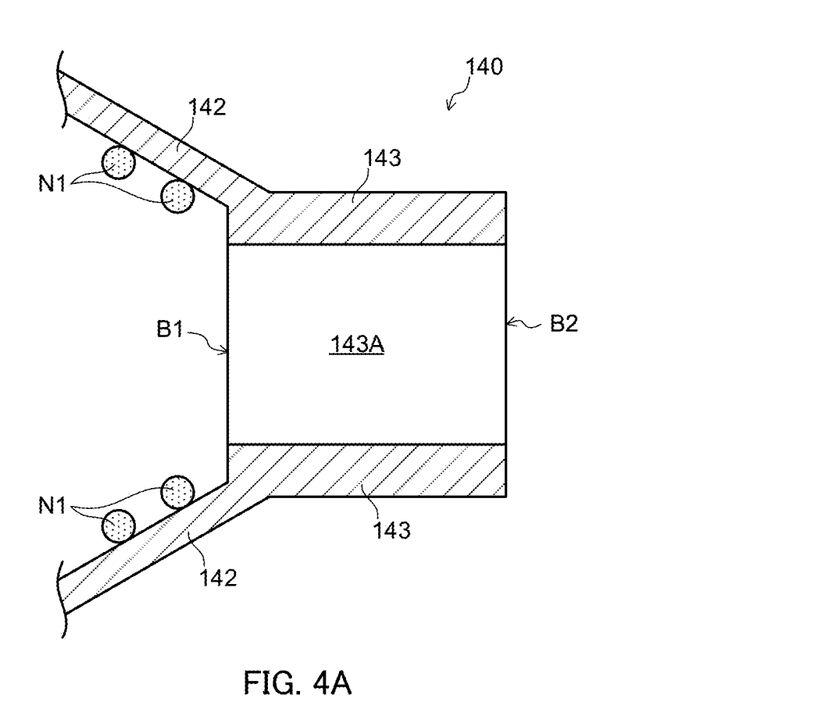
FIG. 4A is a diagram for describing an operation of the mixing member.

Note that, exhaust gas G containing reducing agent N collides with blade portions 142 so that reducing agent N1 adheres to the plurality of blade portions 142 as illustrated in FIG. 4A. When reducing agent N1 is collected on a side of base portion 143 by the flow of the exhaust gas, reducing agent N1 becomes droplets based on reducing agent N1.

When droplets are generated in this way, the droplets do not go to the downstream side of mixing member 140, but drop on an upstream side of mixing member 140 in exhaust pipe 110 in the case of a configuration in which reducing agent passage 143A is not formed in base portion 143, for example. As a result, the droplets may be deposited on the upstream side, and further a white deposit due to the reducing agent may be generated.

When a white deposit is generated on the upstream side of mixing member 140, the white deposit may block the inside of exhaust pipe 110 to make it impossible to perform a predetermined exhaust gas treatment. This phenomenon occurs in a case where an exhaust gas is in a state of relatively low temperature or in a case where the amount of the reducing agent supplied by reducing agent supply portion 120 becomes excessively large.

Figure 4B:
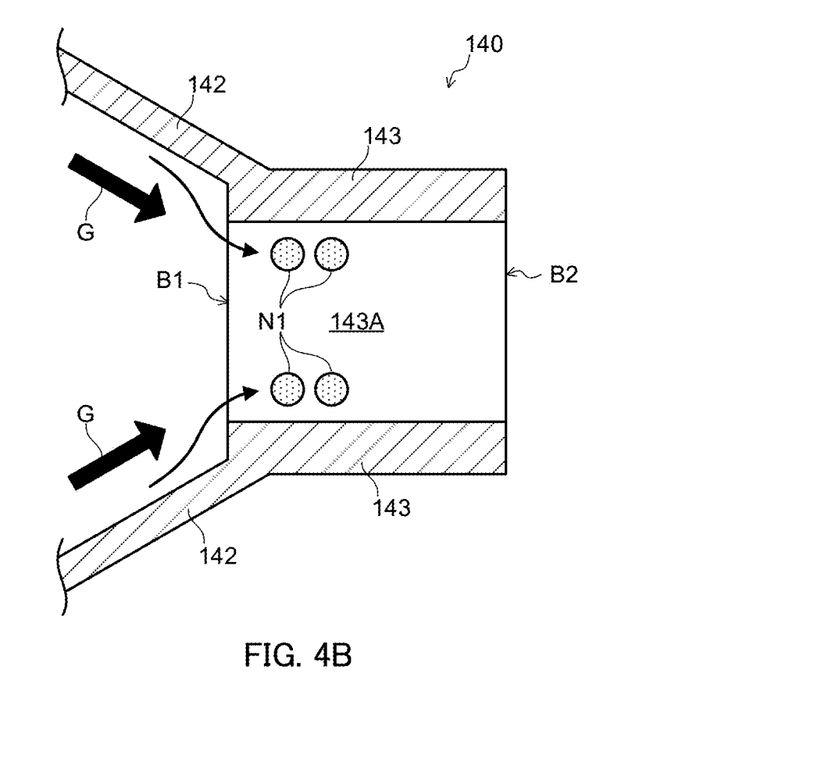
FIG. 4B is a diagram for describing an operation of the mixing member.

In the present embodiment, however, reducing agent passage 143A is formed in base portion 143 so that reducing agent N1 enters reducing agent passage 143A through reducing agent inlet B1 by exhaust gas G as illustrated in FIG. 4B. Reducing agent N1 that has entered reducing agent passage 143A flows out to the downstream side of mixing member 140 through reducing agent outlet B2 by exhaust gas G.

Reducing agent N1 that has flowed out to the downstream side of mixing member 140 is effectively mixed with the exhaust gas by e.g. a swirling flow generated by mixing member 140.

As described above, the present embodiment makes it possible to restrain reducing agent N1 adhering to blade portions 142 from dropping on the upstream side of mixing member 140. As a result, it is possible to restrain generation of a white deposit and further to perform an exhaust gas treatment effectively.

Further, since base portion 143 is formed integrally with the plurality of blade portions 142, it is possible to increase the strength of mixing member 140. For example, in the case of a configuration in which a plurality of blade portions is independent, respectively, the plurality of blade portions may be flapped by an exhaust gas, respectively, and further each blade portion may be damaged.

In the present embodiment, on the other hand, base portion 143 and the plurality of blade portions 142 are integrally formed so that the plurality of blade portions 142 supported by base portion 143 is hardly flapped by an exhaust gas, and further it is possible to increase the strength of mixing member 140.

Further, since the plurality of blade portions 142 is disposed inclined so as to guide the exhaust gas in the gas flow path to reducing agent inlet B1, reducing agent N1 adhering to blade portions 142 easily enters reducing agent inlet B1. In this respect, in the case of a configuration in which blade portions 142 are perpendicular to the exhaust direction or in the case of a configuration in which blade portions 142 are inclined by a minute angle with respect to the exhaust direction, an exhaust gas hardly flows along blade portions 142 when the exhaust gas collides with blade portions 142 so that reducing agent N1 hardly enters reducing agent inlet B1.

In the present embodiment, however, blade portions 142 are disposed inclined so as to guide exhaust gas G to reducing agent inlet B1 so that exhaust gas G collides with blade portions 142, then flows as it is along blade portions 142, and enters reducing agent inlet B1. As a result, reducing agent N1 is easily guided to reducing agent inlet B1 by exhaust gas G so that it is possible to further restrain reducing agent N1 from dropping on the upstream side of mixing member 140.

Figure 5:
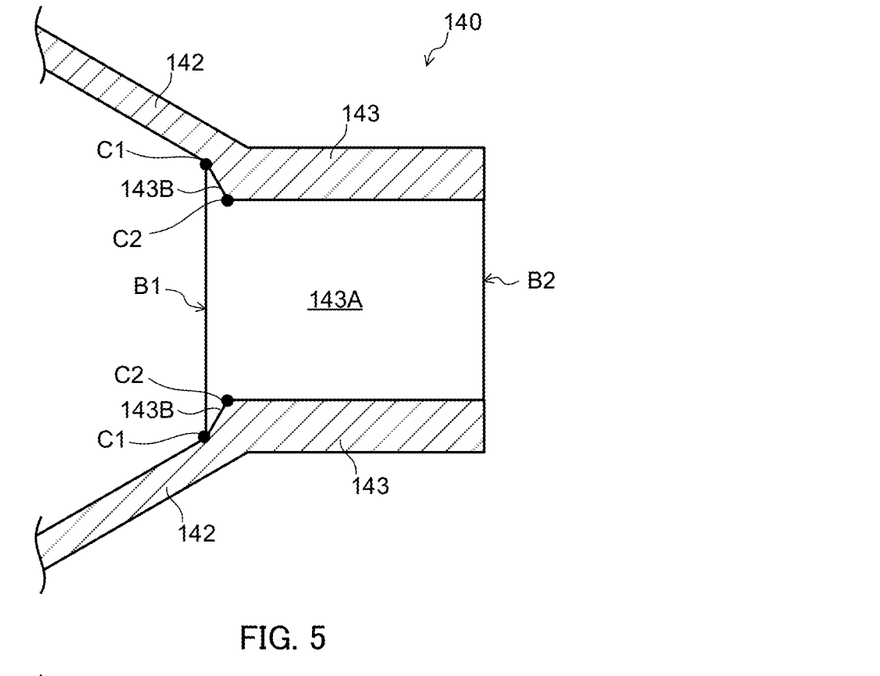
FIG. 5 is a cross-sectional view of a mixing member according to a variation.

Further, as illustrated in FIG. 5, surface 143B which connects connection part C1 between base portion 143 and blade portions 142 with edge C2 of reducing agent inlet B1 may be inclined toward inside of mixing member 140 as surface 143B extends toward a downstream side in the exhaust direction.

In this way, reducing agent N1 which moves along blade portions 142 moves onto surface 143B smoothly and enters reducing agent passage 143A easily so that it is possible to further restrain reducing agent N1 from dropping on the upstream side of mixing member 140.

Figure 6:
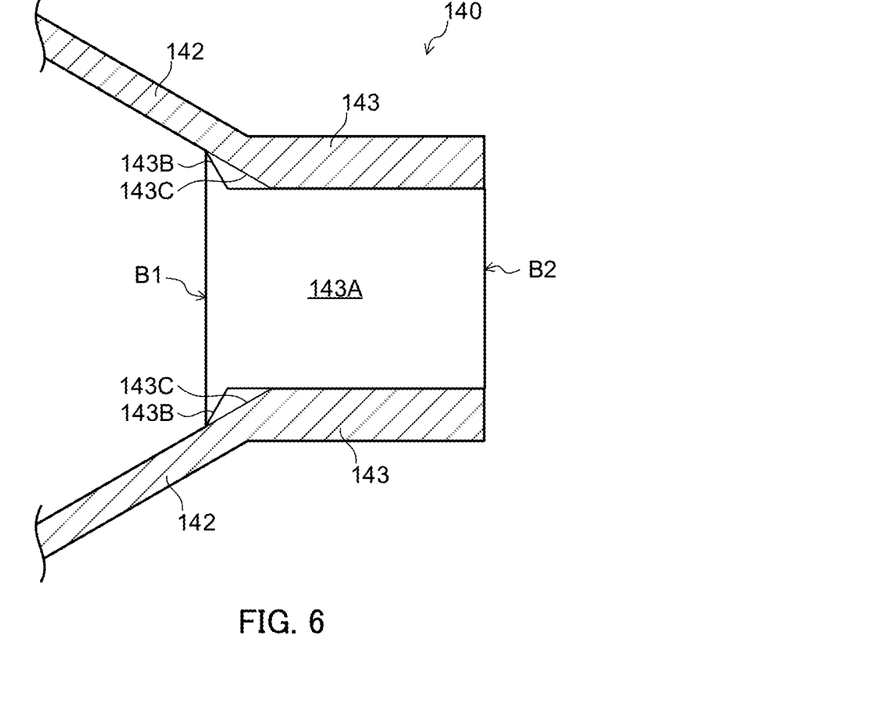
FIG. 6 is a cross-sectional view of a mixing member according to a variation.

Further, as illustrated in FIG. 6, groove 143C extending along an inclination direction of blade portions 142 with respect to the exhaust direction may be formed in the connection part between base portion 143 and blade portions 142, for example, in a part of surface 143B described above.

In this way, reducing agent N1 adhering to blade portions 142 is capable of entering groove 143C along blade portions 142 to enter reducing agent passage 143A smoothly. As a result, it is possible to further restrain reducing agent N1 from dropping on the upstream side of mixing member 140.

Figure 7:
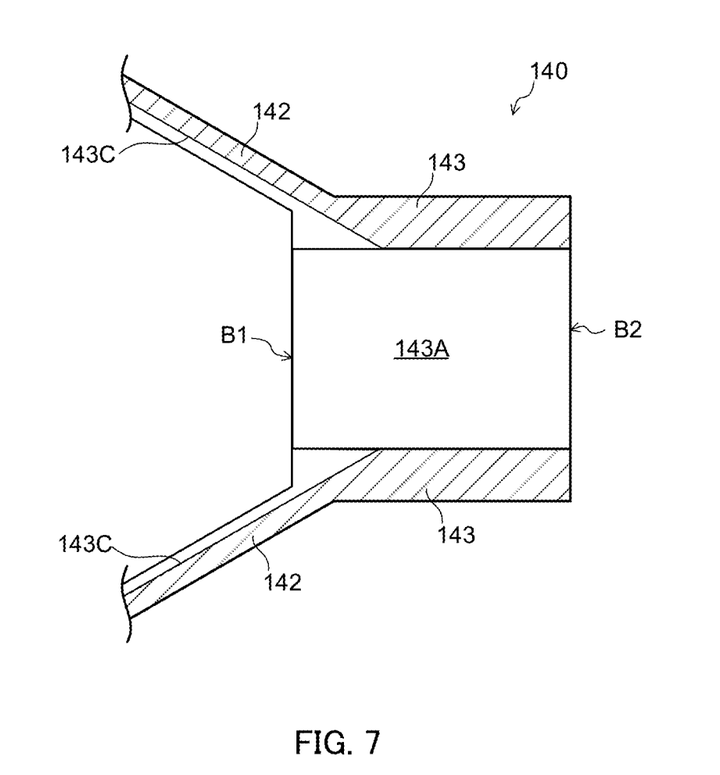
FIG. 7 is a cross-sectional view of a mixing member according to a variation.

Further, as illustrated in FIG. 7, groove 143C as such may be provided in blade portions 142 in their entirety. In this way, reducing agent N1 adhering to blade portions 142 is capable of entering reducing agent passage 143A smoothly. Note that, groove 143C may be provided so as to extend linearly in the radial direction or may be provided so as to extend helically in accordance with the inclination of blade portions 142.

Note that, in the embodiment described above, blade portions 142 are connected to base portion 143 by welding, but the present disclosure is not limited thereto. Blade portions 142 and base portion 143 may be formed by e.g. bending a single plate-like member.

Further, in the embodiment described above, blade portions 142 extend from upstream end surface A1 of base portion 143, but the present disclosure is not limited thereto, and blade portions 142 may extend from a side surface of base portion 143. However, given the possibility that the reducing agent may remain between blade portions 142 and the side surface to generate droplets, blade portions 142 preferably extend from upstream end surface A1 of base portion 143.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

This application is based upon Japanese Patent Application No. 2019-002519, filed on Jan. 10, 2019, the entire contents of which are incorporated herein by reference.

INDUSTRIAL APPLICABILITY

The mixing member of the present disclosure is useful as a mixing member, an exhaust purifying apparatus, and a vehicle that are capable of restraining a reducing agent adhering to a blade portion from dropping on a upstream side of a mixing member.

REFERENCE SIGNS LIST

1 Internal combustion engine
100 Exhaust purifying apparatus
110 Exhaust pipe
120 Reducing agent supply portion
130 Selective reduction catalyst
140 Mixing member
141 Main body portion
142 Blade portion
143 Base portion
V Vehicle

The invention claimed is:

1. A mixing member that mixes an exhaust gas with a reducing agent, the exhaust gas flowing through an exhaust pipe in an exhaust direction, the reducing agent being supplied into the exhaust pipe, the mixing member comprising:
 a base portion disposed in the exhaust pipe and separated from an inner wall of the exhaust pipe and included an upstream end surface on an upstream side in the exhaust direction and a downstream end surface on a downstream side in the exhaust direction; and
 a plurality of blade portions which extends from the base portion toward the inner wall, and which generates a swirling flow of the exhaust gas on a downstream side of the mixing member in the exhaust direction, wherein;
 the plurality of blade portions is disposed inclined with respect to the exhaust direction such that a connection portion of the plurality of blade portions with the base portion is located at a most downstream position of the plurality of blade portions in the exhaust direction;

the base portion includes a reducing agent passage which penetrates both the upstream end surface and the downstream end surface, and which allows the reducing agent to pass through from an upstream side of the mixing member to the downstream side thereof in the exhaust direction;

a surface connecting a connection part between the base portion and the plurality of blade portions with an edge of the reducing agent passage is inclined toward inside of the mixing member as the surface extends toward a downstream side in the exhaust direction; and a groove is formed in the connection part between the base portion and the plurality of blade portions, the groove extending along an inclination direction of the plurality of blade portions with respect to the exhaust direction.

2. The mixing member according to claim 1, wherein the plurality of blade portions extends from the upstream end surface of the base portion on an upstream side in the exhaust direction toward the inner wall.

3. The mixing member according to claim 1, wherein the plurality of blade portions is disposed inclined so as to guide the exhaust gas in the exhaust pipe to a reducing agent inlet of the reducing agent passage.

4. The mixing member according to claim 1, wherein the base portion and the plurality of blade portions are integrally formed.

5. An exhaust purifying apparatus, comprising:

the exhaust pipe;

a selective reduction catalyst provided in the exhaust pipe and promoting reduction of nitrogen oxide in the exhaust gas;

a reducing agent supply portion provided in a stage before the selective reduction catalyst in the exhaust pipe and supplying the reducing agent into the exhaust pipe; and the mixing member according to claim 1 disposed to face a supply port of the reducing agent supply portion in the exhaust pipe.

6. A vehicle, comprising the exhaust purifying apparatus according to claim 5.

\* \* \* \* \*